Figure 2:
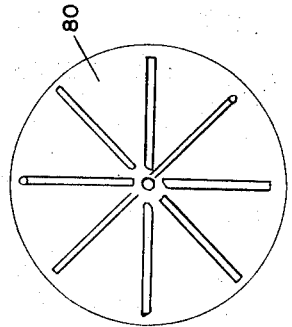

United States Patent [19]
Thomas

[11] 3,781,113
[45] Dec. 25, 1973

[54] METHOD AND APPARATUS FOR PERSONAL IDENTIFICATION

[75] Inventor: Carlton E. Thomas, Van Nuys, Calif.

[73] Assignee: KMS Industries Inc., Ann Arbor, Mich.

[22] Filed: Oct. 26, 1971

[21] Appl. No.: 192,070

Related U.S. Application Data

[63] Continuation-in-part of Ser. No. 774,674, Nov. 12, 1968, abandoned.

[52] U.S. Cl. ........ 356/71, 250/219 DQ, 350/162 SF
[51] Int. Cl. ............................................. G06k 9/08
[58] Field of Search ........................ 350/3.5, 162 SF; 356/71; 250/219 DQ

[56] References Cited
UNITED STATES PATENTS

| | | | |
|---|---|---|---|
| 3,532,426 | 10/1970 | Lemmond | 356/71 |
| 2,020,376 | 11/1935 | Rich | 356/71 UX |
| 2,736,114 | 2/1956 | Krueger | 356/71 UX |
| 3,174,414 | 3/1965 | Myer | 95/1.1 |
| 3,282,152 | 11/1966 | Myer | 95/12 |

Primary Examiner—David Schonberg
Assistant Examiner—F. L. Evans
Attorney—Arthur Raisch et al.

[57] ABSTRACT

A method and apparatus for creating an encoded fingerprint card which consists of a hologram of a fingerprint created by a main illuminating beam and a reference beam on a sensitive photographic plate and the use of the encoded fingerprint in a matched filter correlator in real time wherein the fingerprint of a subject can be introduced into the system and correlated with the encoded information to verify identity between the original encoded information and the person claiming identity therewith. The system also includes an output pick-up utilizing a moving reticle and photomultiplier to determine correlation peaks for registration of identity.

3 Claims, 3 Drawing Figures

PATENTED DEC 25 1973 3,781,113

METHOD AND APPARATUS FOR PERSONAL IDENTIFICATION

This application is a continuation-in-part of my copending application, Ser. No. 774,674, filed Nov. 12, 1968, now abandoned.

This invention relates to a Method and Apparatus for Personal Identification.

With the use of credit cards and charge plates and also with the necessity of identifying personnel for purposes of access to secured areas, it has become a problem to provide positive identification which will prevent impersonation and counterfeiting. Personal recognition, of course, is the ideal way of identification, but it is impossible except in a few instances to have this type of identification as a practical system.

With present day credit cards, it is possible not only to pass off a card which has been stolen, but it is also possible to counterfeit the cards even when the cards are prepared with pictures and so on. This is a problem also with passports, identification cards, driver's licenses and the like. Stolen or counterfeit credit cards cause a loss of millions of dollars annually.

The problem then is to provide a positive system of identification which permits even strangers to identify a person as the proper holder of a card or a proper person to enter an area which has a limited access. Systems using photographs, signatures, fingerprints and mathematical coding can be defeated by counterfeiting which varies in the degree of difficulty but is generally possible.

It is an object of the present system to provide an identification method and an identification card which are essentially secure against impersonation or counterfeiting. The system includes the use of an identification card and also an apparatus which utilizes the card for positive identification but requires in connection with this identification the placing of the fingerprint of the person seeking to be identified at a specified place in the apparatus for a check-out which lends to positive identification. Thus, the system very definitely scrutinizes the fingerprint each time a person is checked and yet this is not simply a matter of comparing fingerprints but involves a matter of encoding the fingerprint information such that counterfeiting is practically impossible.

In brief, this system utilizes a specially prepared identification card which consists of encoded information optically obtained from the actual fingerprint of the subject. In the proper equipment, this encoded information can be checked with the actual fingerprint at a later time utilizing a Fourier transform hologram and identification can be positively established. Thus, impersonation is virtually impossible due to the uniqueness of fingerprints, and counterfeiting is virtually impossible due to the complex form of encoding obtained by the optical system. In addition, the signals obtained by the encoded information and the actual fingerprint are treated optically to obtain a maximum signal to indicate a "go" or "no-go" condition.

Other objects and features of the method, apparatus, and identification data will be apparent in the following description and claims wherein the principles of the invention and the operation are disclosed in connection with the best mode presently contemplated for the practice of the invention.

Figure 1:
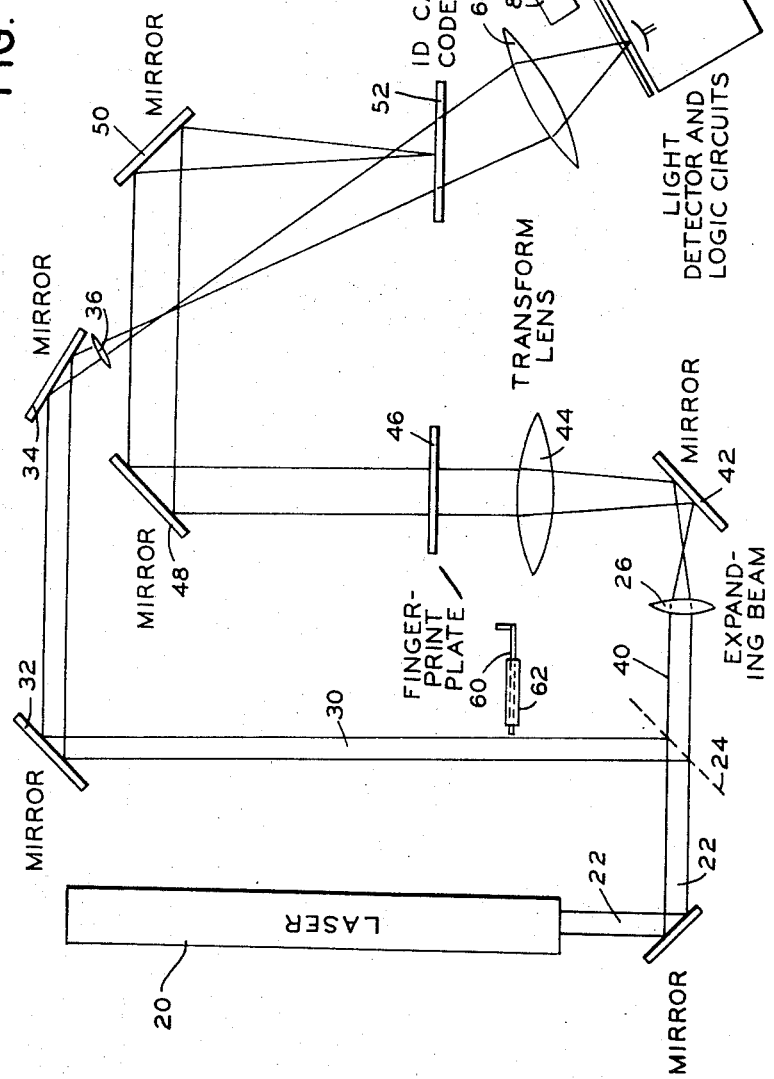

DRAWINGS accompany the disclosure and the various views thereof may be briefly described as:

FIG. 1, a system for encoding fingerprint information and also for comparing an encoded plate with an actual fingerprint.

FIG. 2, an illustration of a photodetected current in the system.

Figure 3:
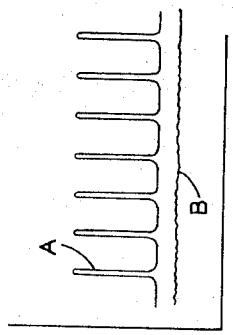

FIG. 3, a view of the reticle of FIG. 1.

The present system is based on what is sometimes referred to as automatic correlation between a person's fingerprint and a specially encoded version of his fingerprint which is stored on an I.D. card or its equivalent. It is necessary to provide proper equipment which will compare the person's real time fingerprint with the impression of the coded fingerprint on his card. Thus, the system scrutinizes the fingerprint each time a person is checked.

In general, the system will involve the necessity of an investigative agency which will suitably identify a person prior to the encoding operation. After this is done, the encoding process is carried on. The investigative agency may be a bank, a police department, or a military agency for the respective purposes of credit cards, drivers' licenses and security clearances. Once the person is identified, he moistens his finger with some oily or soapy substance such as castor oil or cosmetic soap and rolls a fingerprint on the input window of what might be termed a master correlator. The residue from this oily fingerprint is then used to generate a complex light pattern which technically is called a Fourier transform hologram, and this exposes a small piece of photographic film in an I.D. card.

The card is photographically developed, washed, and dried and the identified person is then free to leave the secured area. The apparatus to be used for this encoding will be described below. In connection with the system, there are two possible modes of operation; first, what might be referred to as an "open" system wherein the I.D. cards are carried by the person himself, or, second, what might be referred to as a "closed" system wherein the I.D. card is retained at the identification point and produced only for the purpose of comparison with the person seeking entrance. Since it is possible to control a number of parameters in the preparation of the encoded card, the closed system is essentially impervious to impersonation or counterfeiting and even the open system is essentially safe because of the practical impossibility of duplication of such parameters.

It will be understood that the basic function of the "real time" imprint, whether residue from finger ridges or an impression in a deformable substance, is to phase modulate the laser beam. This might be referred to as real time phase perturbation. Some of the parameters above referred to include the angle of the reference beam in two directions, the exact placement of the Fourier transform on the card in two dimensions, and the magnification of the transform data. There are thus many degrees of adjustment so that many different systems can be set up and an authenticated card in one system cannot operate the equipment in another similar but differently adjusted system.

In this specification and the claims appended, the term "coherent light" source shall be taken to mean a light source such as a laser beam or a monochromatic source resulting from a pin hole and collimator wherein the light waves emanating from a synchronized oscillation of electrons are of the same length and propagating in step.

Now with reference to FIG. 1, the apparatus involved utilizes a basic coherent light input in the form of a laser 20 which, through a mirror, directs a light beam 22 to a beam splitter 24 and also to a lens 26. The beam splitter carries a laser beam 30 up to a second mirror 32 and thence to a third mirror 34 where the beam is again passed through an expanding lens 36 as a reference beam for the holographic effect.

The beam 22 passing through the beam splitter 24 forms a beam 40 which passes through the expanding lens 26 to a mirror 42 and then to a transform lens 44 and through a transparent fingerprint plate 46 to reversing mirrors 48 and 50 and then to an exposure plane 52 which can be used not only to create the encoded information but also for comparison purposes. In creating the encoded information, a suitable I.D. card pack can be provided wherein a section of unexposed photographic film can be covered by a suitable light inhibiting sheet or tab which can be removed for purposes of exposure.

The sensitive film is placed at station 52 and when the subject's fingerprint has been placed on plate 46, an exposure is made with both the reference beam 30 and the main illuminating beam 40 which may be referred to as a spatial modulated light beam exposing the information being directed to the station 52. This will create a Fourier transform hologram of the fingerprint information on plate 46 and, as previously indicated, the parameters of this transform can be controlled by the various optical elements in the system which can be readily maintained as secret information. For example, the type of lens, the spacing of the optical elements, the degree of interference and so on can be controlled as secret information and reconstruction of these parameters from the resulting holographic information is extremely difficult.

Once the encoded information is exposed on the sensitive plate at station 52, the plate may be developed for permanent recording of the information. It will be apparent that one or more fingers can be used but the system has been found satisfactorily accurate with a single print.

To establish identity, a person merely inserts his special I.D. card which has been prepared as above described into an appropriate correlator system as shown in the drawing and similar to that in which the encoding was accomplished. He rolls a fresh fingerprint (using a light oil such as castor oil) on the input window which is plate 46 (FIG. 1) and, under these circumstances, the reference beam is shut off by a slidable turn-off plate 60 suitably mounted on a base 62. The light passing through this fingerprint at plate 46 will be correlated with the I.D. card at station 52 and this light will pass through the lens 64 to a light detector and logic circuit system 70. Normally, the light passing through the fresh fingerprint will automatically trigger the correlator light as soon as the finger is removed from the optical window 46. If, however, the fresh fingerprint is deposited with some rotation relative to its position during the encoded card generation process, then the operator can rotate the input window until correlation does occur which causes the illumination of a signal or correlate light 72. If the wrong fingerprint is deposited, of course, the correlator light 72 remains off. The correlation described is generally known as a matched filter correlator introduced by A. B. Vander Lugt of the University of Michigan and described in an article by Vander Lugt entitled "Signal Detection by Complex Spatial Filtering," University of Michigan, IST Document No. 2900-394-72 November 1963.

The present system involves a variation on this matched filter correlator in the input mechanism as described and the output detection mechanism. The basic system described by Vander Lugt would require a person to make an inked fingerprint on transparent glass to utilize a photograph of an inked fingerprint. The nuisance of fingerprint ink and certainly the delay necessary to develop film each time an I.D. check was made would preclude the use of such a correlator.

The present system operates in real time directly on an oil residue from the finger which is easily wiped off the finger of the person seeking identification. Also in the output, previous matched filter correlators have utilized three types, namely, the output light distribution, which can be technically referred to as the two-dimensional correlation function, (1) viewed through a microscope, (2) photographed on film, or (3) displayed on a closed circuit TV system. All three techniques require a human operator to judge whether or not a correlation peak has occurred.

With the present system, this would require a semi-trained operator at each check point to interpret the light distribution at the output from the correlator. The present system automatically detects correlation peaks. This is accomplished by utilizing a rotating reticle 80 driven by a motor 82 to chop the light distribution from the station 52 before it reaches the light detector. This reticle 80 may consist of a series of radial transparent lines subscribed in an opaque background as shown in FIG. 3. As this motor driven reticle spins, it generates pulses of light if a correlation peak is present.

A photomultiplier in the light detector system picks up these pulses as shown in FIG. 2. The line A showing the peaks occurs when there is proper correlation and the line B occurs when there is improper correlation. It would be possible, of course, to utilize another type of reticle such as a vibrator, i.e., a plate vibrating in its own place, rather than a rotating reticle. The reticle is necessary to discriminate between light peaks and a general distributed light level. Thus, an incorrect fingerprint may produce as much total light energy (since all fingerprints have approximately the same frequency content), at the output of the correlator, but the correct fingerprint causes much of this light energy to be concentrated in one relative small spot called the correlation peak. Thus, a photomultiplier by itself would not satisfactorily detect correlation peaks. The electrical waveform from the photomultiplier is fed to a Schmidt trigger which turns on the correlate indicator lamp.

The holographic information in the present invention is being utilized "in reverse," it might be said, to recreate a reference beam. By way of explanation, a hologram is normally created using a "subject" or "illuminating" beam of coherent light and a reference beam from the same source. In the present instance a hologram of the original subject fingerprint is created in this way. Ordinarily then the hologram plate is used to regenerate the subject when it is illuminated with the reference beam. However, in the present instance it is not the purpose to recreate the subject fingerprint but rather it is the purpose to recreate the reference beam.

Thus, in the correlation system the holographic record of the original identified print is illuminated with the subject beam as modified by the real time subject fingerprint. If the real time subject beam matches the original subject beam, the resulting output is the reference beam in such intensity as can readily be detected, as above described.

It will be appreciated that there are three basic units disclosed here. First, there is a camera for generating I.D. cards which includes elements such as the laser source 20, the input system including elements 26, 42, 44, 46, 48, 50 and 52, and the reference beam elements 24, 32, 34, 36. Secondly, there is a slave correlator which correlates fresh fingerprints with I.D. cards made in any camera or any master correlator within the same identification system. This correlator omits the elements 24, 30, 32, 34, 36, 60, 62 of FIG. 1. Finally, the entire system of FIG. 1, can be used to generate new I.D. cards and to correlate fresh fingerprints with previously prepared cards made on any camera or any other master correlator from the same system.

The camera could, of course, be used in the investigative agency where personal identification was established and where no correlation would be needed. The slave correlator would be used outside the secure environment to check personnel with little risk of counterfeiting since it cannot generate new cards. The device in the form of the correlator can also be used to activate a lock or an "on" switch so that the I.D. cards could be used by proper personnel to secure enclosures, computers, gas pumps, etc. No attendant would be necessary with this control system.

I claim:

1. In an apparatus for establishing identity using holograms of the fingerprint in a complex correlation procedure in which a source of coherent light directs a beam to an optical system, the output of which registers correlation or non-correlation, in which a spatial filter is inserted corresponding to a fingerprint of a known person for complex correlation with an impression of a fingerprint of a person present, that improvement which comprises means for interposing in said beam an imprint of a finger surface to phase modulate the beam in connection with the complex correlation, a light responsive means positioned to receive the phase modulated beam as correlated with said spatial filter to indicate by light intensity the fact of matching or non-matching, and a light reticle positioned in said beam at the correlation output directly ahead of said light responsive means comprising a plate having a series of spaced transparent lines in an opaque background, means to support and move said plate across said beam to interrupt the light beam at regular intervals to achieve spatial discrimination between bright spots of correlation light and a randomly distributed light pattern, said light responsive means being responsive to light peaks passing said reticle, and an indicator operable in response to correlation light peaks at said light responsive means to register when correlation occurs.

2. In a method of establishing identity of a person by complex correlation of the fingerprint of the person with a spatial filter of a known person in which a coherent light beam is directed to an optical system for such correlation, that improvement which comprises:
   a. providing a relatively hard, non-deformable, transparent surface in the coherent beam of the optical system,
   b. placing a quantity of light transmitting oil on the surface,
   c. impressing a fingerprint in said oil on said surface to create a series of ridges and valleys in the light transmitting oil,
   d. removing the finger from the surface to leave a print in said oil,
   e. utilizing the residual oil print as input to phase modulate the coherent light beam passing through said oil and said surface to correlate the phase modulated beam with a pre-existing spatial filter of a fingerprint in the coherent light beam,
   f. rapidly interrupting the correlation output beam to achieve spatial discrimination between light peaks and a randomly distributed light pattern, and
   g. directing said output beam to a light responsive indicator to register existence or absence of light peaks and consequent matching or non-matching of the input and the spatial filter.

3. In an apparatus for establishing identity using holograms of the fingerprint in a complex correlation procedure in which a source of coherent light directs a beam to an optical system, the output of which registers correlation or non-correlation, in which a spatial filter is inserted corresponding to a fingerprint of a known person for complex correlation with an impression of a fingerprint of a person present, that improvement which comprises interposing in said beam of coherent light a transparent element having a relatively hard, non-deformable surface, an oil film of light transmitting oil on said surface for receiving an imprint of a finger to phase modulate the beam in connection with the complex correlation after removal of the finger from said surface, a light responsive means positioned to receive the phase modulated beam as correlated with said spatial filter to indicate by light intensity the fact of matching or non-matching, and a light reticle positioned in said beam at the correlation output directly ahead of said light responsive means comprising a plate having a series of spaced transparent lines in an opaque background, means to support and move said plate across said beam to interrupt the light beam at regular intervals to achieve spatial discrimination between bright spots of correlation light and a randomly distributed light pattern, said light responsive means being responsive to light peaks passing said reticle, and an indicator operable in response to correlation light peaks at said light responsive means to register when correlation occurs.

* * * * *